United States Patent
Gerhards

(10) Patent No.: US 8,607,402 B2
(45) Date of Patent: Dec. 17, 2013

(54) VACUUM CLEANER WITH A VACUUM CLEANER FAN

(75) Inventor: Manfred Gerhards, Euskirchen (DE)

(73) Assignee: Miele & Cie. KG, Guetersloh (DE)

( * ) Notice: Subject to any disclaimer, the term of this patent is extended or adjusted under 35 U.S.C. 154(b) by 329 days.

(21) Appl. No.: 13/084,616

(22) Filed: Apr. 12, 2011

(65) Prior Publication Data
US 2011/0252593 A1 Oct. 20, 2011

(30) Foreign Application Priority Data

Apr. 16, 2010 (EP) .................................. 10401057

(51) Int. Cl.
*A47L 5/00* (2006.01)
(52) U.S. Cl.
USPC ............................................. 15/319; 15/339
(58) Field of Classification Search
USPC .......................................... 15/319, 339, 412
See application file for complete search history.

(56) References Cited

U.S. PATENT DOCUMENTS

| 5,276,939 | A * | 1/1994 | Uenishi ............................. 15/319 |
| 5,881,430 | A * | 3/1999 | Driessen et al. ................. 15/319 |
| 6,526,622 | B2 * | 3/2003 | Conrad ............................. 15/319 |
| 7,698,777 | B2 * | 4/2010 | Fujiwara et al. ................. 15/339 |
| 2007/0136980 | A1 | 6/2007 | Fujiwara |

FOREIGN PATENT DOCUMENTS

| EP | 1997417 A2 | 12/2008 |
| JP | 5023273 A | 2/1993 |
| JP | 11221180 A | 8/1999 |

* cited by examiner

Primary Examiner — Dung Van Nguyen
(74) Attorney, Agent, or Firm — Leydig, Voit & Mayer, Ltd.

(57) ABSTRACT

A vacuum cleaner includes a drive unit having a maximum input power and a drive unit operating device configured to operate the drive unit below the maximum input power. The drive unit operating device includes a regulating unit configured to regulate an actual input power of the drive unit within a first operating range in which an input power is above a predefinable upper limit. The regulating unit is operable to detect a controlled variable including the actual input power and/or a measure of the actual input power, compare the actual input power to a reference variable including the predefinable upper limit and/or a measure of the predefinable upper limit, and influence the actual input power of the drive unit so as to conform the actual input power of the drive unit to the reference variable.

6 Claims, 3 Drawing Sheets

VACUUM CLEANER WITH A VACUUM CLEANER FAN

CROSS REFERENCE TO RELATED APPLICATIONS

This application claims priority to European Patent Application No. EP 10 401 057.4, filed Apr. 16, 2010, which is hereby incorporated by reference herein in its entirety.

FIELD

The invention relates to a vacuum cleaner with a vacuum cleaner fan.

BACKGROUND

Vacuum cleaners are often evaluated primarily in terms of their input power, whereby a high input power raises the expectation that this will translate into a strong suction power. Under various operating conditions and the associated restriction of the suction, that is to say, for example, due to differences in the floor being vacuumed, especially in the case of carpeting of differing densities, the electric input power of a vacuum cleaner does not remain constant but rather drops steadily from the "open hose" state (without restriction) to the complete closure of the suction hose. However, the air watt P2—as the product of negative pressure and flow rate—has its maximum approximately in the middle between the maximum flow rate and thus the maximum electric input power, and the flow rate of zero and thus the minimum electric input power. This means that, due to the characteristic curve of the fan and of the motor, within the range of the maximum achievable air watt (approximately in the middle of the characteristic curve), it is no longer possible for the initial, maximum electric input power to be obtained from the mains and converted, but rather, only a much lower electric input power is available to be converted into air watt.

Since the input power of the drive unit of the vacuum cleaner fan—referred to below as the "input power of the vacuum cleaner" for short or simply as the "input power"—could become increasingly relevant when it comes to meeting stipulations for complying with a given energy efficiency class for electric household appliances and thus also for vacuum cleaners, it is normally not an option to increase the input power in order to compensate for the diminishing air watt.

Moreover, for reasons having to do with the system, as the dust bag fills up, the air watt available at the floor tool decreases because the pressure loss inside the dust bag increases with the filling level. Due to a likewise diminishing flow rate through the floor tool or through a suction hose connected to the floor tool, and due to fact that the input power of a drive unit of the vacuum cleaner fan depends on the flow rate, the input power drops even more, so that in the final analysis, only a small amount of air watt is available at the floor tool.

European patent application EP 1997417 A2 describes the suction pressure on the basis of a combination of the power measurement and the rotational speed of a reluctance motor.

One procedure with vacuum cleaners is to ascertain the drawn current and to limit it to a maximum value in order to comply with restrictions pertaining to the maximum current input in supply networks with limited current input. Japanese patent application JP 5 023273 A, for instance, describes such a method. US patent application 2007/136980 A1 and Japanese patent application JP 11221180 A are likewise aimed at limiting or regulating the motor current. Here, however, voltage fluctuations are not taken into account. Such voltage fluctuations have different causes:

As a rule, electric devices are approved for a wide voltage range. Thus, for example, the same device can be used in Japan at a rated voltage of 100 volts and in the United States at a rated voltage of 120 volts. Since the voltage decreases quadratically, this leads to a 44% higher power input in the United States.

Voltage fluctuations occur in the voltage networks as a function of the total consumption by users; here, 10% is permissible.

Switching on loads that entail a high input power, which includes vacuum cleaners, results in a load-dependent voltage drop.

All in all, due to the possible voltage fluctuations, the desired suction power can fluctuate by up to 50%, even in vacuum cleaners whose motor current is limited or regulated.

SUMMARY

In an embodiment, the present invention provides a vacuum cleaner including a drive unit having a maximum input power and a drive unit operating device configured to operate the drive unit below the maximum input power. The drive unit operating device includes a regulating unit configured to regulate an actual input power of the drive unit within a first operating range in which an input power is above a predefinable upper limit. The regulating unit is operable to detect a controlled variable including at least one of the actual input power and a measure of the actual input power, compare the actual input power to a reference variable including at least one of the predefinable upper limit and a measure of the predefinable upper limit, and influence the actual input power of the drive unit so as to conform the actual input power of the drive unit to the reference variable.

BRIEF DESCRIPTION OF THE DRAWINGS

Embodiments of the invention will be explained in greater detail below with reference to the drawings. Items or elements that correspond to each other have the same reference numerals in all of the figures. The embodiment or each embodiment is not to be construed as a limitation of the invention. On the contrary, within the scope of the present disclosure, numerous changes or modifications are possible, especially those that can be gleaned by the person skilled in the art with an eye towards providing a device having similar advantages and addressing similar problems, for example, through a combination or modification of individual features in conjunction with the features contained in the general description of the embodiment or of each embodiment and described in the claims and contained in the drawings or method steps that can be gleaned therefrom, and that lead to a new subject matter through combinable features. In the drawings:

DETAILED DESCRIPTION

Figure 1:
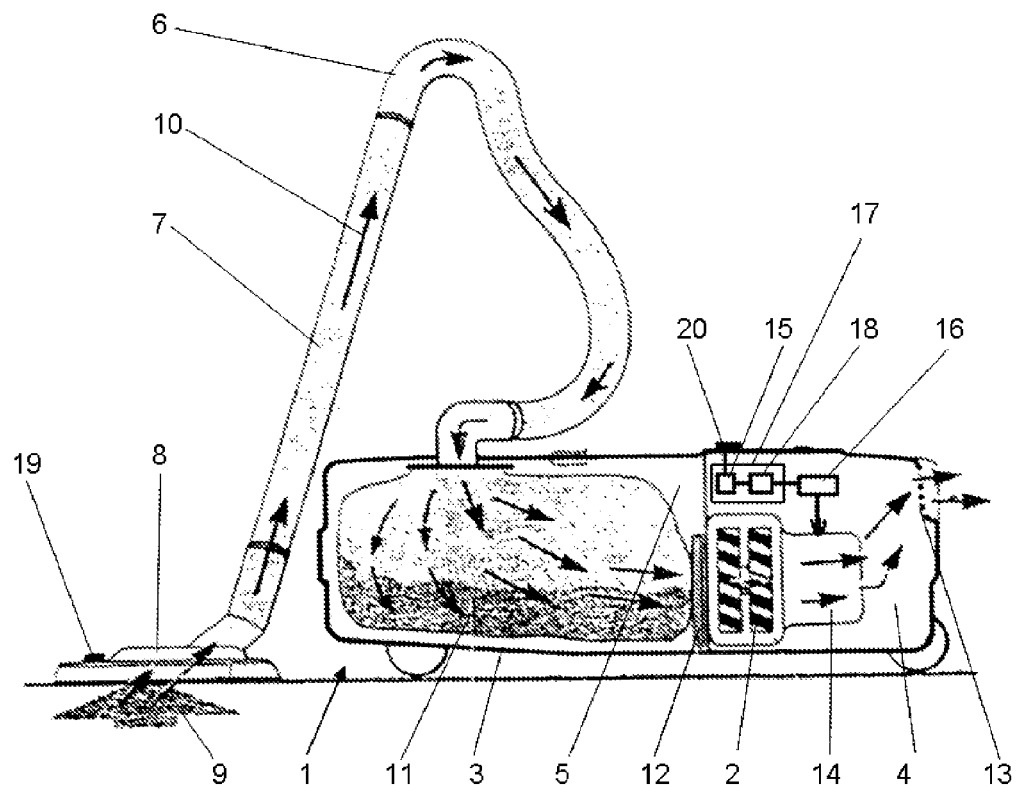
FIG. 1 shows a canister vacuum cleaner.

In an embodiment the present invention provides a vacuum cleaner that can achieve a favorable air watt without having to increase the input power.

With vacuum cleaners configured according to embodiments of the invention, the electric power P1 that is actually drawn from the network can be regulated to a predefinable value, making use of the momentarily present voltage and of the momentarily drawn current, so that the input power can be precisely controlled during the normal fluctuations in the present network voltage due to current-dependent voltage drops, network tolerances or manufacturing tolerances. Moreover, embodiments of the present invention make it possible to ensure the same and constant input power with vacuum cleaners of the same type without additional adaptations, even in the case of different network voltages (230 V/240 V) and (100 V/120 V) (so-called universal voltage power supply).

In an embodiment, the present invention provides a vacuum cleaner having a drive unit with a maximum input power and having means for operating the drive unit below its maximum input power with a predefined or predefinable upper limit for the input power and a regulating unit comprised by or associated with the means for operating the drive unit below its maximum input power. The regulating unit detects the actual input power of the drive unit as the controlled variable and compares it to the upper limit for the input power, or to a measure of the upper limit, for the input power as a reference variable. Moreover, the regulating unit can influence the actual input power so that it can conform with the reference variable, at least in a first operating range in which an input power might be above the upper limit for the input power.

One way for operating the drive unit below its maximum input power is an electronic control unit with which the suction power of the vacuum cleaner fan can be adjusted. For one thing, the additional or alternative regulating unit limits the input power of the drive unit to the upper limit for the input power so as to ensure compliance with limit values, for example, a given energy efficiency class. Moreover, the regulating unit makes it possible for the actual input power (controlled variable) to approximate the upper limit for the input power (reference variable), so that a constant input power is established within the range of the upper limit for the input power, at least in an operating range in which an input power might be above the upper limit for the input power, so as to maximize the air watt available at the floor tool with the constant input power, even as the filling level of the dust bag increases.

In a particular embodiment of the invention, it is provided that the regulating unit can detect or does detect the controlled variable on the basis of the motor current that can be supplied to the drive unit as well as, at the same time, on the basis of the motor voltage that is present. Detecting the controlled variables on the basis of the motor current comprises the immediate detection of the motor current itself as well as at least the indirect detection of the motor current during a power measurement according to which, as is known, the electric power value is obtained by multiplication of the current and the voltage, here the motor current and the motor voltage. These electric variables can easily be detected with generally known means and can be further processed by analog or digital methods. According to another embodiment, the vacuum cleaner comprises means for converting these electric variables that have been detected as controlled variables into extra-low voltages that can be processed by the regulating unit. Through such a conversion of the detected electric variables, each controlled variable can be directly processed by the regulating unit. Means for converting the controlled variables into extra-low voltages that can be processed, especially in the case of a motor current detected as a controlled variable, include a so-called shunt resistor or a current converter, and in the case of the motor voltage, preferably a voltage divider.

In particular, a so-called generalized phase control can be used in order to limit the input power of the drive unit. Accordingly, for one embodiment of the vacuum cleaner of the type described above and in greater depth below, it is provided that the means for limiting the input power of the drive unit to the upper limit for the input power comprises a generalized phase control that can be actuated by a regulator of the regulating unit, whereby the actuation of the generalized phase control by means of the regulator makes it possible for the controlled variable to approximate the reference variable.

In an embodiment, the present invention also provides a method for operating a vacuum cleaner wherein an upper limit for the input power, which is either fixed or variable, is predefined, and in that the means limits the input power of the drive unit to the upper limit for the input power, in that the regulating unit, especially its regulators, detects the actual input power, or a measure of the actual input power, as the controlled variable, it compares the actual input power to the upper limit for the input power, or to a measure of the upper limit for the input power, as the reference variable, and it influences the actual input power so that it can conform with the reference variable, at least in a first operating range in which an input power might be above the upper limit for the input power.

Embodiments of the method can include another load that is connected to the vacuum cleaner, for example, an electric carpet brush, that is affected by the limitation to the upper limit for the input power in the same manner as the drive unit is. In an alternative embodiment of the method, it is provided that another load that is connected to the vacuum cleaner is not affected by the limitation to the upper limit for the input power.

If the limitation to the upper limit for the input power is also extended to other loads, it is possible to reliably ensure compliance with limit values of the kind associated, for example, with a given energy efficiency class. Moreover, when an additional load in the form of an electric power roller attachment is used, the power input of the drive unit of the vacuum cleaner fan is considerably reduced in comparison to operation without such a power roller attachment, so that both units, that is to say, the power roller attachment and the drive unit of the vacuum cleaner fan, can be operated within the limits of the upper limit for the input power.

If additional loads are not affected by the limitation to the upper limit for the input power, then they can be operated at the appertaining maximum power and with the associated efficiency, while an optimal air watt is achieved at the floor tool by the limitation of the drive unit to the upper limit for the input power.

Embodiments of the present invention allow for a reduction of the suction power at the floor tool resulting from the increasing filling level of the dust bag to be completely compensated for or at least compensated for to a considerable extent. This compensation takes place in that the input power, which normally likewise diminishes due to the decreasing flow rate, is restricted to an initial, maximum value or to the predefined or predefinable upper limit for the input power by means of the regulating unit. Furthermore, embodiments of the invention also allow the drive unit, especially a commutator motor that forms the drive unit, and the fan unit to be always subject to certain manufacture tolerances within the production series, so that, as a result, the input power of the individual vacuum cleaner also fluctuates by a certain unavoidable percentage. The also allows a compensation of such fluctuations so that all vacuum cleaners of a series including embodiments of the invention can be operated at essentially the same input power. Moreover, embodiments of the present invention compensate for the fact that the input power is not constant over the entire service life of a motor, but rather, it changes as a function of the condition and age of the vacuum cleaner. The reasons for this are, for instance, the condition of the bearings, a shift towards a so-called neutral zone, patina formation on a commutator running surface, decreasing brush resistances, increasing brush contact resistances, etc. Finally, embodiments of the invention also allow the compensation of a diminishing input power during household use of a vacuum cleaner resulting from the fact that, as the drive unit heats up over the course of use, the winding resistance increases and consequently the input power decreases. This drop in power can also be compensated for with an approach according to an embodiment of the invention.

FIG. 1 schematically shows a vacuum cleaner 1 in an embodiment as a canister vacuum cleaner. However, the invention is fundamentally suited for any vacuum cleaner 1 that is equipped with a fan unit having a motor-driven suction fan 2. Additional examples are hand-held vacuum cleaners, upright vacuum cleaners, battery-operated vacuum cleaners or robotic vacuum cleaners. The vacuum cleaner 1 shown has a housing 3 that is divided into a fan chamber 4 and a dust collection chamber 5. In the fan chamber 4, the suction side of the suction fan 2 faces the dust collection chamber 5, where it generates a negative pressure that is conveyed to the suction opening of a floor tool 8. Thus, air loaded with dirt 9—indicated by the arrows 10—is picked up from the floor that is being vacuumed, and then it is cleaned via the dust separator. In the embodiment, this is a dust bag 11 with a downstream motor filter 12 and an exhaust air filter 13. The cleaned air is then discharged into the surroundings. The fan motor 14 is actuated by a functional unit that comprises at least the electronic regulating unit 15 of a power inverter. The electronic regulating unit 15 switches power semiconductors 16 and it is a component of a microprocessor control unit 17 symbolized by a box. The microprocessor control unit 17 also contains an evaluation circuit 18 for ascertaining the type of floor covering and it is in communication with an operating and display panel 20 shown in FIG. 2. In addition to the evaluation circuit 18, the vacuum cleaner 1 can also have a floor covering sensor arranged in the floor tool 8, for example, an ultrasonic sensor 19 with an appropriate electronic evaluation unit.

Figure 2:
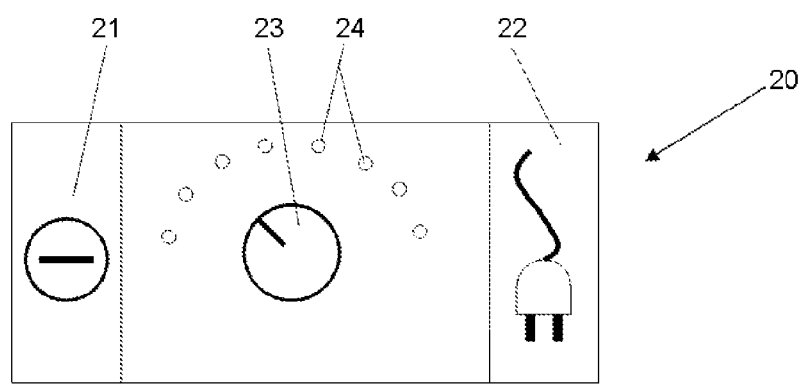
FIG. 2 shows an operating panel of a vacuum cleaner according to FIG. 1.

FIG. 2 shows the operating and display panel 20. An ON-OFF switch 21 and a power cord retractor button 22 are arranged at the sides. In the center, there is a knob 23 with which different power levels 24 can be selected (power selection). The knob 23 and the electronic regulating unit 15 actuated as a function of its setting are means to operate the drive unit (suction fan 2) below its maximum input power.

Figure 3:
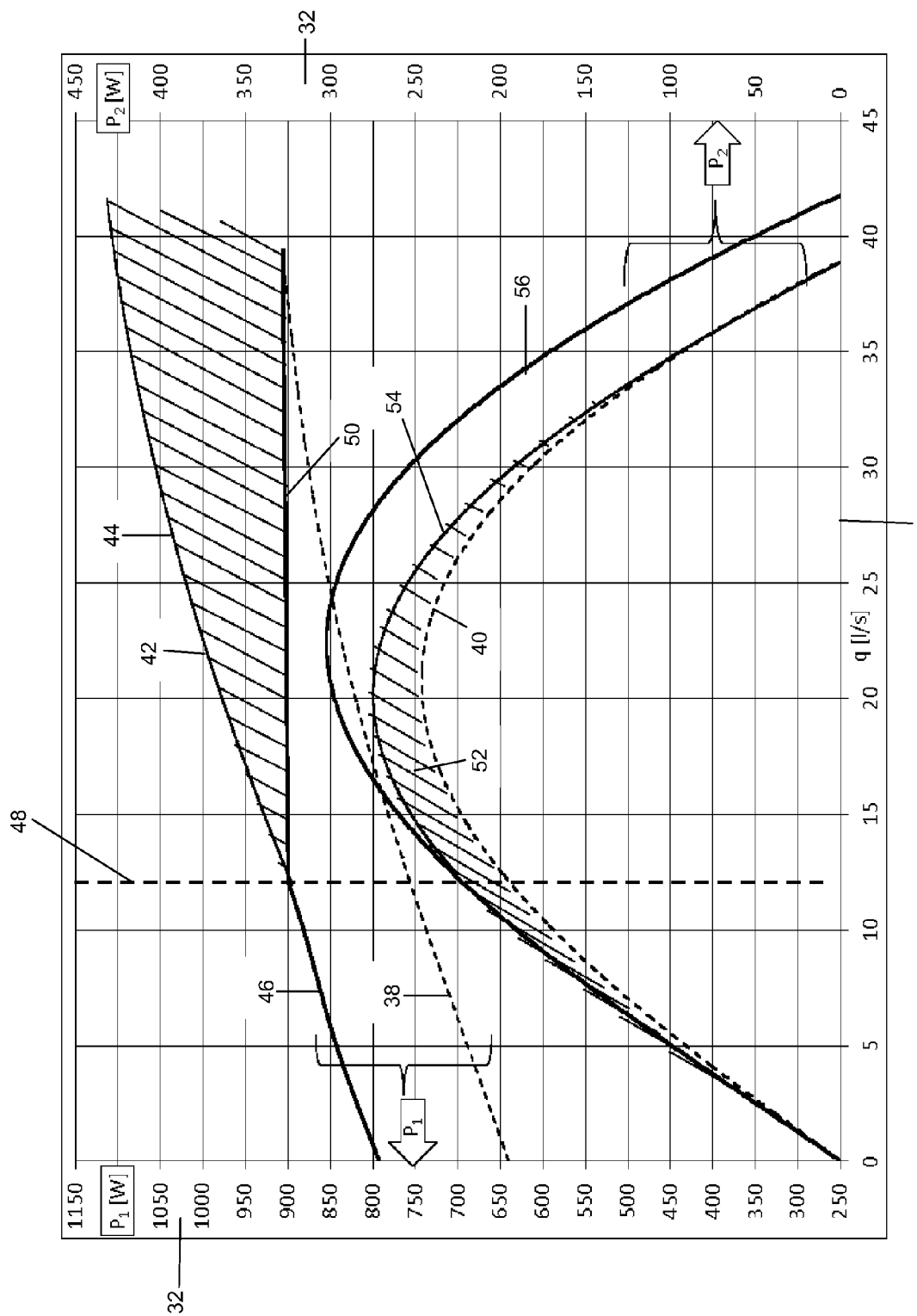
FIG. 3 shows various characteristic curves for at least two differently configured drive units of a vacuum cleaner.

FIG. 3 shows an actually recorded characteristic curve of a drive unit for a fan unit of a vacuum cleaner 1 (FIG. 1). The drawn electric power P1 is plotted on a left-hand ordinate 32. An air watt P2 that is output at the floor tool is plotted on the right-hand ordinate 34. The characteristic curves are plotted on the abscissa 36 over a flow rate q.

A first power input curve 38 represents a fan unit with a drive unit that achieves a maximum input power $P1_{max}$ of approximately 1000 W at a maximum flow rate $q_{max}$=39 l/s (liters per second) at the rated voltage. The motor voltage that is present can fluctuate over a wide range—here approximately ±20 V—from the nominal value over the course of the characteristic curve without having any effects on the drawn power. In the depicted experimental execution, an associated first air watt characteristic curve 40 of the output air watt P2 conform with a maximum at a flow rate of approximately q=21 l/s at a maximum air watt $P2_{max}$ of approximately 240 W. Here (q=21 l/s), the electric input power P1, however, is now only 825 W which, on the basis of the total efficiency, can be converted into the air watt P2.

A second power input curve 42 with its first and second characteristic curve sections 44, 46 depicts a curve of the power input of a more powerfully dimensioned motor that, at the rated voltage, achieves a maximum input power $P1_{max}$ of approximately 1060 W at $q_{max}$=40.5 l/s.

Embodiments of the present invention are configured so as to feed a reduced voltage to a more powerful drive unit (motor unit) having a power input curve that corresponds, for example, to the second power input curve 42, up to a limit 48 in such a way as to obtain a constant input power P1 that is independent of the flow rate q (restricted state). In FIG. 3, this is depicted by a regulated characteristic curve section 50. The result is that, also within the range of the maximum air watt or output power $P2\text{-}_{max}$, the drive unit operates at the same input power P1 as at the point of the maximum input power $P1_{max}$; consequently, the characteristic curve of the input power is a straight line in sections (regulated characteristic curve section 50). Beyond the limit 48, the regulated motor voltage is so high that it corresponds to the rated or network voltage that is present. Then, as the dust bag becomes fuller (increasing pressure loss through the dust bag; decreasing flow rate q), the characteristic curve follows a normal drive characteristic curve at a constant voltage (second characteristic line section 46).

The limit 48 results from the position of the upper limit for the input power, here P1=900 W, on the second power input curve 42 belonging to the more powerfully dimensioned drive unit. Flow values above the limit 48 result in a first operating range in which an input power might be above the upper limit for the input power. Through the regulation, the actual input power (controlled variable) in this first operating range is compared to the upper limit for the input power (reference variable), and the former is influenced so that it can conform with the upper limit for the input power. German standard DIN 19226 defines the term regulation as follows: "Regulating or regulation is a process in which a first variable (controlled variable) is continuously detected, compared to another variable (reference variable), and influenced so that it can conform with the reference variable." In a second operating range, in which the input power might already be below the upper limit for the input power, regulation in the sense described above is no longer possible or necessary.

The advantage in the achievable air watt P2 between a regulated and an unregulated drive unit (characteristic curves 50 and 46 or 38) can be seen in a cross-hatched area 52 that is formed between the first air watt characteristic curve 40 belonging to the unregulated drive, here $P1_{max}$=900 W, and a second characteristic curve 54 belonging to a regulated, powerful drive unit, likewise regulated to an upper limit for the input power of $P1_{max}$=900 W. This cross-hatched area 52 represents the additionally achievable air watt P2 at the floor tool for each operating point on the characteristic curve. The increase in the air watt P2 has its greatest effect in an actual operating and application range of the vacuum cleaner 1, namely, within the range between a flow rate volume of approximately q=10 l/s and q=27 l/s.

A third air watt characteristic curve 56 represents the air watt P2 of the more powerfully dimensioned drive unit during unregulated operation, that is to say, during operation corresponding to the second power input curve 42.

Accordingly, the depiction in FIG. 3 shows that, when a more powerfully dimensioned drive unit is constantly operated in the first operating range at the maximum input power of a less powerful drive unit (=upper limit for the input power), a significant increase in the air watt P2 can be achieved within the relevant operating range. Thanks to the limitation of the input power to this upper limit, which is achieved during constant operation within the range of the upper limit for the input power, it is not only possible to increase the air watt P2 but also to comply with limit values associated with a given energy efficiency class or statutory requirement or other recommended values.

Figure 4:
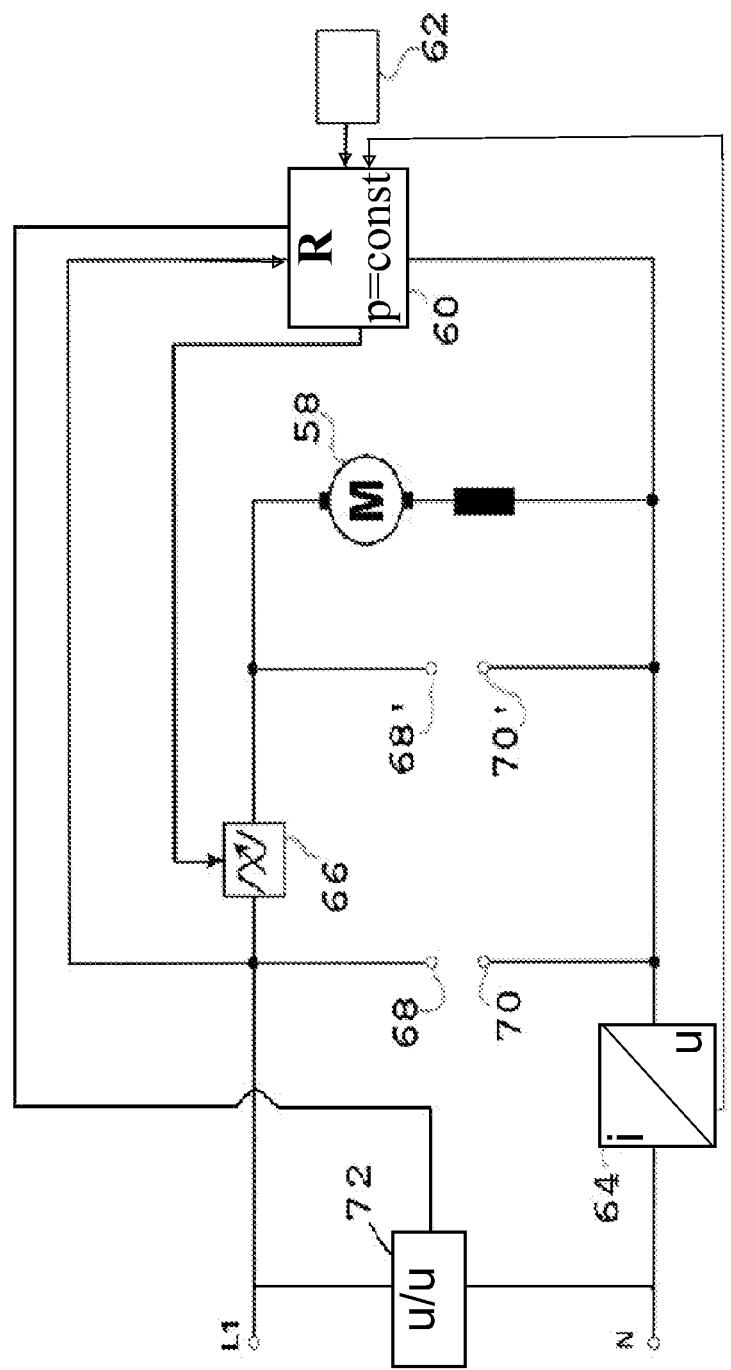
FIG. 4 shows a schematically simplified circuit diagram in accordance with an embodiment of the invention.

FIG. 4 shows an example for a realization of the approach according to the invention. A drive unit of a vacuum cleaner 1 (FIG. 1) is shown as an electric motor 58; it corresponds to the fan motor 14 shown in FIG. 1. As is normally this case, it can be connected to a supply voltage that is fed via connection terminals L1, N, usually a household low-voltage network with an effective rated value of 230 V AC. The connection cable of the vacuum cleaner 1 is provided in order to feed the supply voltage to the connection terminals.

A regulator 60 is provided in order to influence the actual input power of the drive unit, i.e. the electric motor 58 here, so that it can conform with the predefined or predefinable upper limit for the input power. The predefined or predefinable upper limit for the input power, or a measure of it, is prescribed to the regulator 60 by means of a power setting device 62. The power setting device 62 can be influenced by the user of the vacuum cleaner 1. Normally, the power setting device 62 brings about a fixed external power specification by establishing the upper limit for the input power at its output. The upper limit for the input power is processed by the regulator 60 as the reference variable. As the controlled variable, the regulator 60 processes the actual input power, or a measure of the actual input power, of the electric motor 58. The momentary motor current as well as the momentarily present motor voltage are used as a measure of the actual input power. The motor current can be detected, for instance, by a current-voltage converter, and the motor voltage that is present can preferably be detected by a voltage divider. Signal converters without phase shift are advantageous for good and precise regulation procedures. The current-voltage converter 64 can be implemented as a shunt resistor. This shunt resistor can be realized as a discrete component on an electronic circuit board comprising the circuit shown in FIG. 4 or in the form of conductors provided there that are suitable in view of the appropriate selection of length and cross section. The low voltage that can be thus obtained can be processed before being fed to the regulator 60 (rectification and/or smoothing and/or, if applicable, integration). The low voltage that is proportional and cophasal to the network voltage, optionally also after being processed, can likewise be made available to the regulator 60. According to an internal regulation functionality and on the basis of the reference variable supplied by the power setting device 62, on the basis of the controlled variable supplied by the current-voltage converter 64, as well as on the basis of the controlled variable supplied by the voltage sensor 72, the regulator 60 actuates a control element that is shown in FIG. 4 as the power semiconductor 66 and that, in this embodiment, brings about a generalized phase control.

All other known possibilities for regulating the power of the electric motor 58 are also options, e.g. generalized phase control, series resistance, pulse-width modulation, frequency converter, field tapping and the like. The power input of the electric motor 58 is influenced by means of the actuation of the power semiconductor 66 or of other suitable means for the power regulation of the electric motor 58.

The output of the regulator 60 can also be selected with a power setting chosen by the user, so that the upper limit for the input power specified by the power setting device 62 functions as the global limit value for the power input of the electric motor 58, whereby said limit value can be lowered by a power setting accessible to the user, in other words, in terms of timing and in accordance with the requirements of the user. A knob 23 that is configured, for example, as a potentiometer can serve to establish the power setting that can be selected by the user.

Fundamentally, any known regulation functionality is an option as the regulation functionality of the regulator 60, thus, for instance, a proportional controller (P controller), a proportional integral differential controller (PID controller), or a combination thereof, e.g. a PD controller, etc. The regulation functionality can be implemented in the form of software or hardware in the regulator 60.

The depiction in FIG. 4 shows connection terminals 68, 70; 68', 70', parallel to the electric motor 58. Additional loads can be attached such as, for example, vacuum cleaner attachments, for instance, an electric carpet brush. If the connection terminals 68, 70 are arranged electrically upstream from the power semiconductor 66, the load or each additional load that can be connected there is supplied directly with the present network voltage via L1, N. Thus, the power regulation for the electric motor 58 effectuated by the regulator 60 does not relate to additional loads that can be connected to these connection terminals 68, 70. If the connection terminals 68', 70' are arranged electrically downstream from the power semiconductor 66, the limitation of the input power of the electric motor 58 to the upper limit for the input power also has the same effect as for the electric motor 58 on the load or on each additional load that is connected to these connection terminals 68', 70'. The terms "electrically upstream from" and "electrically downstream from" the power semiconductor 66 refer to the situation as gleaned from the feed point at L1, as can also be seen from the depiction in FIG. 4. In practical embodiments, normally only a pair of connection terminals 68, 70; 68', 70' are provided, that is to say, either only connection terminals 68, 70, which allow the operation of additional loads without power limitation, or else only connection terminals 68', 70', which allow the operation of additional loads with power limitation. In special embodiments, both variants can also be implemented concurrently.

The circuit shown in FIG. 4—without the loads—is an example of a regulating unit for implementing the invention. Accordingly, it comprises the regulator 60, the power setting device 62, the current-voltage converter 64, the voltage sensor 72 and, as the control element, the power semiconductor 66.

On the basis of the approach according to the invention, in the case of a limitation of the electric input power, also in the case of a conceivable statutory limitation of this input power, it is possible to provide precisely this input power even in the operating range of the maximum air watt and the maximum efficiency. In comparison to conventional systems, the result is an increase of 10% to 20% in the suction power at the floor tool.

Embodiments of the present invention thus provide a vacuum cleaner 1 having a vacuum cleaner fan that is driven at a maximum input power by a drive unit, especially a fan motor 14 or electric motor 58, and having means for operating the drive unit below its maximum input power, said vacuum cleaner 1 being characterized by a predefined or predefinable upper limit for the input power and by a regulating unit, whereby the regulating unit, especially its regulators 60, can detect the actual input power, or a measure of the actual input power, as the controlled variable, it can compare the actual input power to the upper limit for the input power, or to a measure of the upper limit for the input power, as the reference variable, and it can influence the actual input power so that it can conform with the reference variable, at least in a first operating range in which an input power might be above the upper limit for the input power, so that, on the one hand, the result is an increase in the suction power in a certain operating range in comparison to a drive unit having a maximum input power within the range of the currently predefined or predefinable upper limit for the input power and, at the same time, the possibility to comply with certain limit values, e.g. in order to meet requirements for a given energy efficiency class. The means for operating the drive unit below its maximum input power refers to an electronic control unit—in the broadest sense of the word—of the vacuum cleaner 1 that comprises, for example, a knob 23 (FIG. 2) for setting the suction power of the vacuum cleaner fan. The embodiment of the invention shown in FIG. 4 by way of an example is part of such an electronic control unit. Hence, as the means for operating the drive unit below its maximum input power, this electronic control unit also comprises the regulating unit with the regulator 60, the power setting device 62, the current-voltage converter 64, the voltage sensor 72 and the power semiconductor 66 shown as a control element, which effectuates the power regulation of the electric motor 58. The regulating unit, as a combination of the regulator 60, the power setting device 62, the current-voltage converter 64, the voltage sensor 72 and the power semiconductor 66, detects the actual input power, or a measure of the actual input power, compares the controlled variable to the upper limit for the input power, or to a measure of the upper limit for the input power, as the reference variable, and influences the actual input power so that it can conform with the reference variable, at least in a first operating range in which an input power might be above the upper limit for the input power.

The scope of the invention is defined in the claims. References in the dependent claims relate to the further refinements of the subject matter of a corresponding independent claim, and are not to be understood as a renunciation of achieving an independent, concrete protection for the feature combinations of the dependent claims that refer back to a respective independent claim. Furthermore, with respect to an elucidation of the claims in which a feature is elaborated upon in concrete terms in a dependent claim, it is to be assumed that there is no such a limitation in the respective preceding claims.

While the invention has been particularly shown and described with reference to preferred embodiments thereof, it will be understood by those skilled in the art that various changes in form and details may be made therein without departing from the spirit and scope of the invention.

What is claimed is:

1. A vacuum cleaner comprising:
   a drive unit having a maximum input power;
   a drive unit operating device configured to operate the drive unit below the maximum input power, the drive unit operating device including a regulating unit configured to regulate an actual input power of the drive unit within a first operating range in which an input power is above a predefinable upper limit, the regulating unit being operable to:
      detect a controlled variable including at least one of the actual input power and a measure of the actual input power,
      compare the actual input power to a reference variable including at least one of the predefinable upper limit and a measure of the predefinable upper limit, and
      influence the actual input power of the drive unit so as to conform the actual input power of the drive unit to the reference variable,
   wherein the regulating unit is configured to detect the controlled variable based on a motor current and a motor voltage supplied to the drive unit, and
   wherein a convertor is configured to convert detected electric variables forming the basis of the controlled variable into extra-low voltages, and wherein the regulating unit is configured to process the extra-low voltages.

2. The vacuum cleaner recited in claim 1, wherein the drive unit operating device includes a generalized phase control that is activatable by the regulating unit and configured to limit the controlled variable so as to approximate the reference variable.

3. A vacuum cleaner comprising:
   a drive unit having a maximum input power;
   a drive unit operating device configured to operate the drive unit below the maximum input power, the drive unit operating device including a regulating unit configured to regulate an actual input power of the drive unit within a first operating range in which an input power is above a predefinable upper limit, the regulating unit being operable to:
      detect a controlled variable including at least one of the actual input power and a measure of the actual input power,
      compare the actual input power to a reference variable including at least one of the predefinable upper limit and a measure of the predefinable upper limit, and
      influence the actual input power of the drive unit so as to conform the actual input power of the drive unit to the reference variable,
   wherein the regulating unit is configured to detect the controlled variable based on a motor current and a motor voltage supplied to the drive unit, and
   wherein the drive unit operating device includes a generalized phase control that is activatable by the regulating unit and configured to limit the controlled variable so as to approximate the reference variable.

4. A method for operating a vacuum cleaner comprising:
   defining an upper limit of an actual input power to a drive unit of the vacuum cleaner;
   operating the drive unit in a first operating range in which an input power is above the upper limit;
   regulating the actual input power to the upper limit using a regulating unit, the regulating including:
      detecting a controlled variable including at least one of the actual input power and a measure of the actual input power,
      comparing the actual input power to a reference variable including at least one of the upper limit and a measure of the upper limit, and
      influencing the actual input power so as to conform the actual input power to the reference variable; and
   using a generalized phase control to influence the controlled variable so as to conform the controlled variable with the reference variable.

5. The method recited in claim 4 wherein the regulating the actual input power correspondingly affects a power to a supplementary load connected to the vacuum cleaner.

6. The method recited in claim 4 wherein regulating the actual input power does not affect a power to a supplementary load connected to the vacuum cleaner.

* * * * *